United States Patent [19]
Goossens et al.

[11] Patent Number: 5,617,710
[45] Date of Patent: Apr. 8, 1997

[54] PROCESS AND APPARATUS FOR PRODUCING CLOSED SEALED CAPSULES

[75] Inventors: Francis Goossens, Simaai, Belgium; Francis Petitjean, Hachimette, France

[73] Assignee: Warner-Lambert Company, Morris Plains, N.J.

[21] Appl. No.: 714,705

[22] Filed: Sep. 16, 1996

Related U.S. Application Data

[63] Continuation of Ser. No. 260,653, Jun. 16, 1994, abandoned, and a continuation of Ser. No. 616,240, Mar. 13, 1996, abandoned.

[51] Int. Cl.$^6$ .................... B65B 1/00; B65B 7/28
[52] U.S. Cl. .................... 53/471; 53/485; 53/489; 53/281; 53/287; 53/329
[58] Field of Search .................... 53/454, 471, 281, 53/560, 478, 485, 489, 53, 329, 287

[56] References Cited

U.S. PATENT DOCUMENTS

| | | | |
|---|---|---|---|
| 2,936,493 | 5/1960 | Scherer | 53/281 X |
| 3,025,652 | 3/1962 | Sandhage et al. | 53/281 X |
| 3,078,629 | 2/1963 | Besemer et al. | 53/471 |
| 3,162,000 | 12/1964 | Kraven | 53/471 |
| 3,200,556 | 8/1965 | Ackley | 53/485 |
| 4,089,152 | 5/1978 | Zanasi | 53/281 |
| 4,478,658 | 10/1984 | Wittwer | 53/471 X |
| 4,581,875 | 4/1986 | MacLaughlin et al. | 53/471 X |
| 4,940,499 | 7/1990 | Lebrun et al. | 53/471 X |
| 5,188,688 | 2/1993 | Boardman et al. | 53/471 X |
| 5,317,849 | 6/1994 | Sauter | 53/281 X |

FOREIGN PATENT DOCUMENTS

| | | |
|---|---|---|
| 0090600 | 5/1983 | European Pat. Off. . |
| 0118240 | 9/1984 | European Pat. Off. . |
| 0569656 | 11/1993 | European Pat. Off. . |
| 3735260 | 4/1989 | Germany . |
| 2187703 | 9/1987 | United Kingdom . |

*Primary Examiner*—Horace M. Culver
*Attorney, Agent, or Firm*—Charles W. Almer

[57] ABSTRACT

A process and an apparatus for producing closed sealed capsules are disclosed. The capsules contain releasable substances packaged in at least one cavity inside the capsules which are formed of two or more joined sealed parts of substantially organic, film forming material. The process comprises the steps of: (a) providing a first part of the capsule having a first contact zone; (b) filling the first part of the capsule with the substances to be packaged; (c) providing at least a second part of the capsule having a second contact zone; (d) applying binding means to at least one of the contact zones; (e) joining the parts of the capsule, so that the contact zones come into contact via the binding means; and (f) pressing the joined parts of the capsule together with a predetermined force so that portions of opposite contact zones are kept in pressed contact for a predetermined period of time to obtain the closed sealed capsule. Also disclosed is an apparatus for carrying out this process, preferably including a channel (31) having a first opening (56) and a second opening (43) spaced apart from the first opening (56), such that joined parts (21, 22) of the capsules (20) are insertable into the channel (31) through the first opening (56), are guidable along the channel (56) and are ejectable from the channel (31) through the second opening (43), whereby the inserted parts (21, 22) of the capsules (20) form a row such that successive pairs of joined parts (21, 22) stay in direct contact with one another.

32 Claims, 8 Drawing Sheets

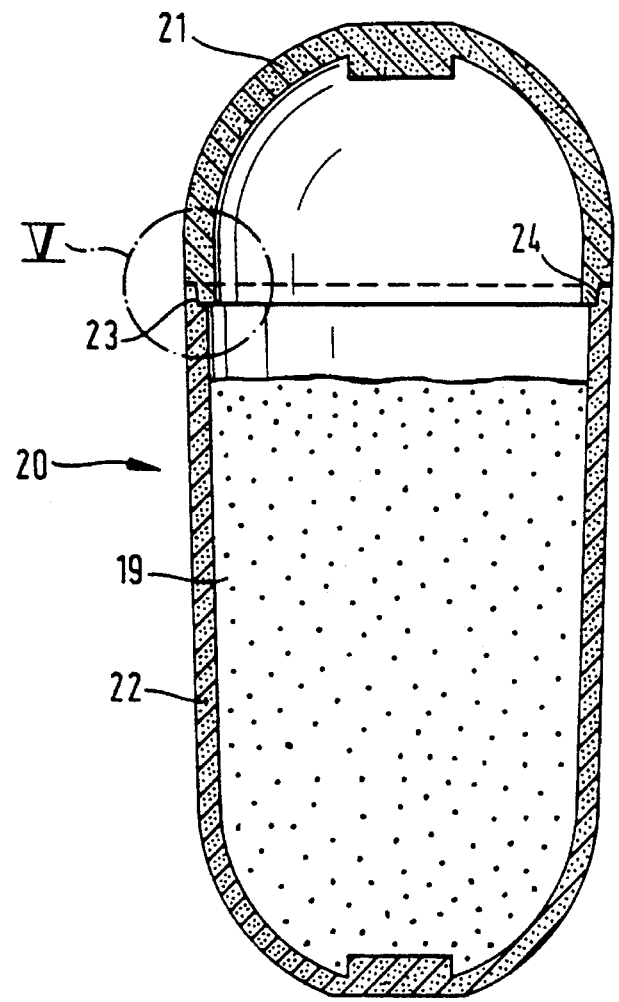
_Fig. 4_
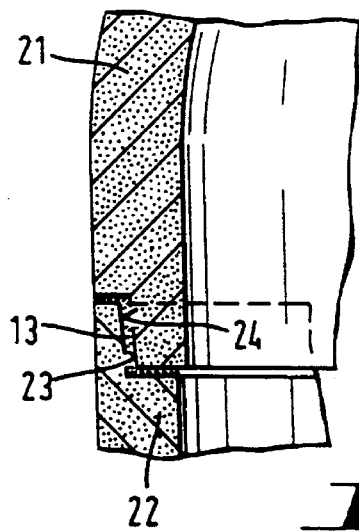
_Fig. 5_

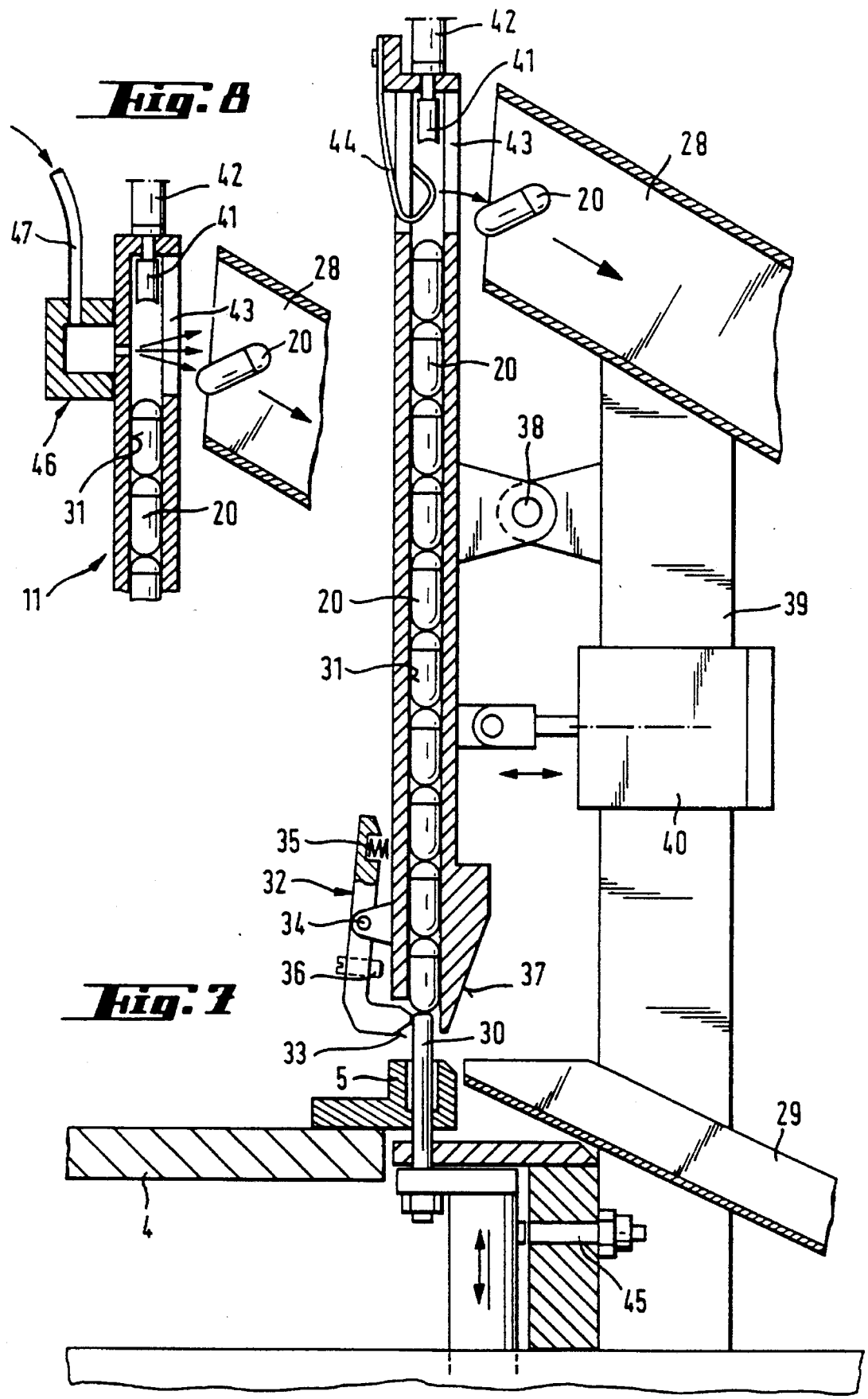

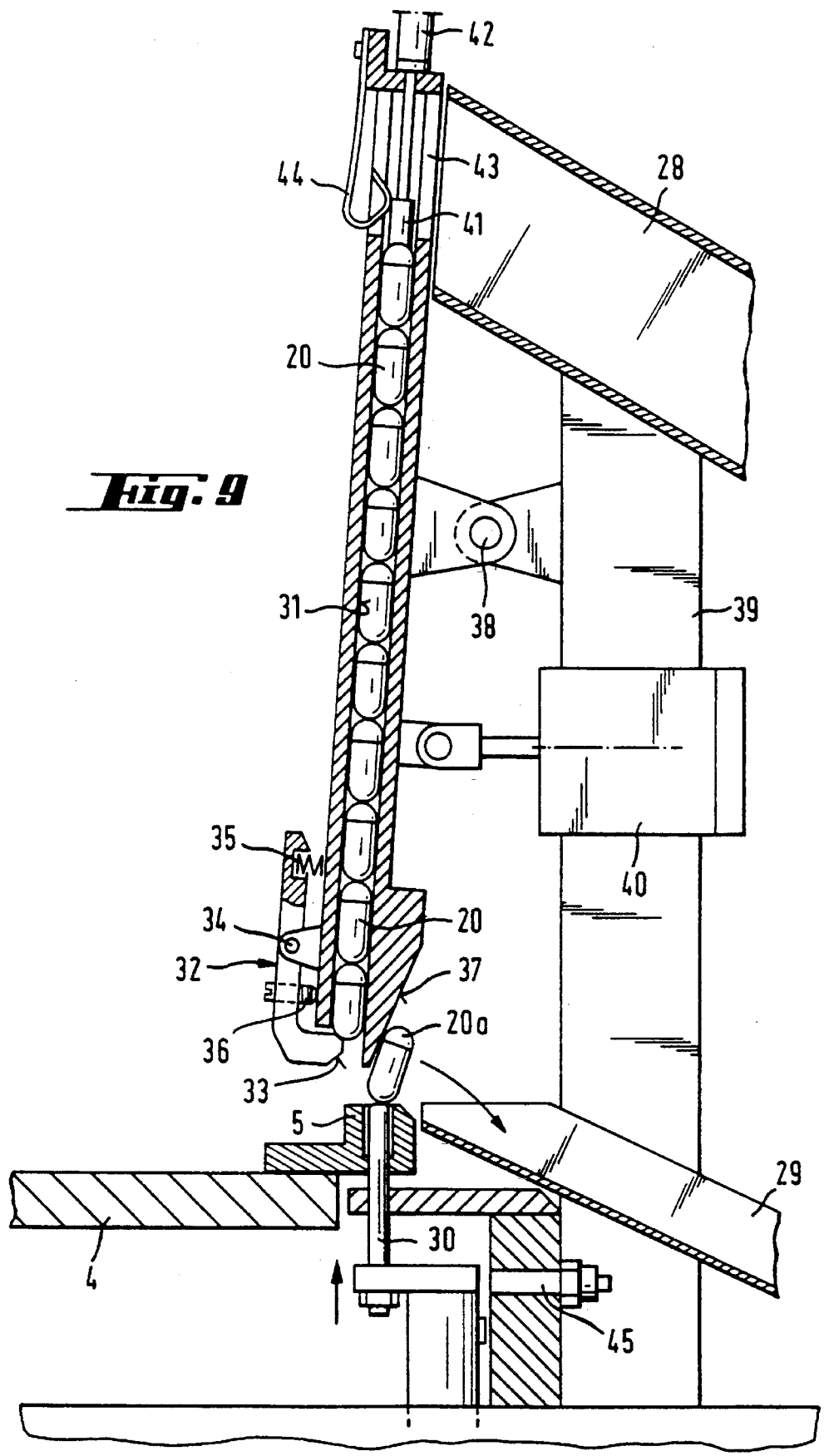

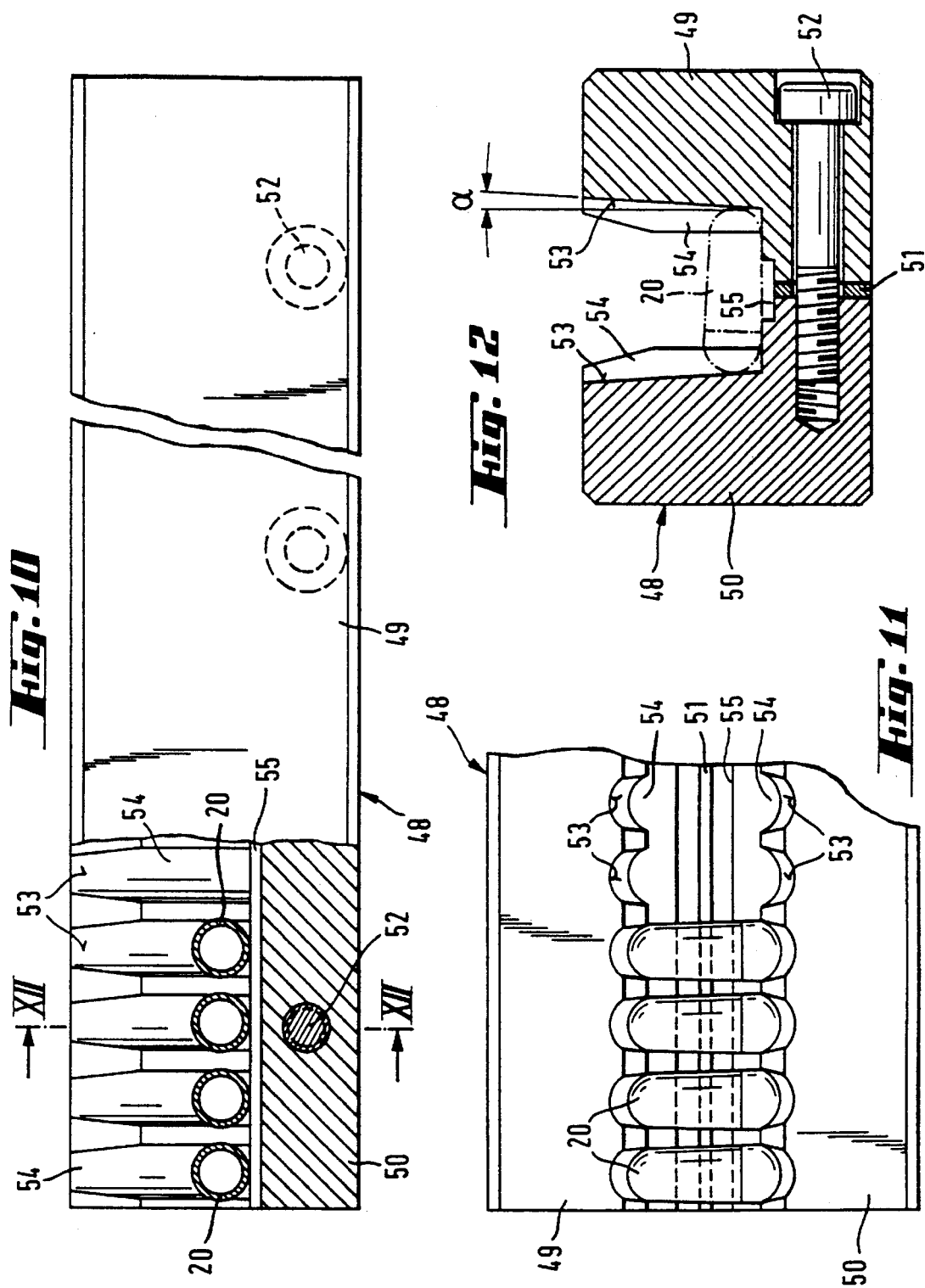

PROCESS AND APPARATUS FOR PRODUCING CLOSED SEALED CAPSULES

RELATED APPLICATION INFORMATION

This specification is a continuation of U.S. patent application Ser. No. 08/260,653, filed on Jun. 16, 1994 and now abandoned and U.S. patent application Ser. No. 08/616,240, filed on Mar. 13, 1996 and now abandoned.

FIELD OF THE INVENTION

This invention relates to a process and an apparatus for producing closed sealed capsules, more specifically, to a process and an apparatus for producing closed sealed, two piece capsules containing a very fine powder or a liquid of medium or low viscosity.

DESCRIPTION OF THE PRIOR ART

Two piece gelatine capsules and more recently two piece starch capsules are widely used as containers for pharmaceutical products, consumables, chemicals and the like. They are, in particular, produced in the shape of pharmaceutical capsules for the dosed administration of medicines. These capsules comprise an enlarged part called body or container part in which the product to be packaged is filled and a smaller part called cap or closure part which is normally placed on top of the enlarged part.

To guarantee a closure between the two parts, GB 2 187 703 provides a process for filling and closing a capsule. The process according to GB 2 187 703 comprises bringing a sealing liquid into contact, for example with the contact area of the closure part and subsequently uniting the container part and the closure part in order to form the sealed capsule. To bring a sealing liquid into contact with the contact areas various methods have been suggested. Document DE-A 37 35 260 discloses a device for wetting the closure part of a two piece capsule, whereby the sealing liquid is sprayed onto the contact zone of the closure part. An excess of sealing liquid is removed by suction means. Document EP-A 0 569 656 and document GB 2 187 703 disclose processes in which the sealing liquid is absorbed by an absorbing material and transferred to the contact zone of the closure part of the capsule by bringing the contact zone in direct contact with the absorbing material.

These processes have proven to be effective in preventing the two parts of the filled capsule from falling apart, and to provide an adequate sealing for most of the powders packaged in the capsule. However, for the packaging of very fine powders and for the packaging of liquids of medium and low viscosities, a further improvement is necessary. For these purposes the conventional sealing is not tight enough to prevent the very fine powders or the liquids of medium and low viscosities leaking out of the closed capsule. An obvious solution to this problem is to increase the quantity of sealing fluid to achieve a more uniform and larger sealing zone. However, due to the increase of sealing fluid, deformations of the capsules at the joining zone appear. These deformations might be considered as a cosmetic defect in minor cases, but they could cause different capsules to stick together in more severe cases. Furthermore, the increase of sealing fluid might lead to a partial reopening of the capsules due to excessive remoisturizing of the capsule joining zone and pressure which has built up inside while joining the two parts quickly ("piston effect").

SUMMARY OF THE INVENTION

It is therefore an object of the present invention to achieve a tight sealing between two parts of the capsules so that very fine powders and liquids having medium or low viscosities can be packaged without leakage.

It is an object of the present invention to achieve a tight sealing between two parts of the capsules without the negative effects of excessive fluid deposition and partial reopening of the sealed zone. It is a further object of the present invention to provide a process for joining and sealing two pieces of a capsule that significantly reduces the amount of joined and sealed parts that have to be rejected due to defects inside the sealing zone.

The foregoing objects are achieved by the present invention by providing a process for producing closed sealed capsules containing releasable substances packaged in at least one cavity inside the capsules, which are formed of two or more joined sealed parts of substantially organic, film forming material. The process according to the present invention comprises the steps of: (a) providing a first part of the capsule having a first contact zone; (b) filling the first part of the capsule with the substances to be packaged; (c) providing at least a second part of the capsule having a second contact zone; (d) applying binding means to at least one of the contact zones; (e) joining the parts of the capsule, so that the contact zones come into contact via the binding means; and (f) pressing the joined parts of the capsule together with a predetermined force so that portions of opposite contact zones are kept in pressed contact for a predetermined period of time to obtain the closed sealed capsule.

It is a further object of the present invention to provide an apparatus for producing closed sealed capsules containing releasable substances packaged in at least one cavity inside the capsules which are formed of two or more joined sealed parts of substantially organic, film forming material.

It is a further object of the present invention to provide an apparatus that is capable of performing the process for producing closed sealed capsules according to the present invention. The foregoing objects are achieved by the present invention by providing an apparatus that comprises first feeding means for providing a first part of the capsule having a first contact zone; filling means for filling the first part of the capsule with the substances to be packaged; second feeding means for providing a second part of the capsule having a second contact surface; wetting means for applying binding means to at least one of the contact zones; joining means for joining the two parts of the capsule so that the contact zones come into contact via the binding means; and at least one pressing device for pressing the joined parts of the capsule together with a predetermined force so that portions of opposite contact zones are kept in pressed contact for a predetermined period of time to obtain the closed sealed capsule.

BRIEF DESCRIPTION OF THE DRAWINGS

FIG. 4 shows a cross-section of a finished capsule.

FIG. 5 is an enlarged view showing the contact zones of the capsule.

FIG. 7 shows the pressing device according to FIG. 6 in a situation after the new capsule has been inserted into the pressing device and a capsule near the top of the pressing has been ejected from the pressing device.

FIG. 8 shows a further embodiment of the ejection means.

FIG. 9 shows the pressing device in a position in which a defect capsule is rejected.

FIG. 10 shows a side view of another embodiment of a pressing device according to the present invention.

FIG. 11 is a top view of the pressing device according to FIG. 10.

FIG. 12 shows a cross-section according to the line XII—XII in FIG. 10.

DETAILED DESCRIPTION OF PREFERRED EMBODIMENTS

Figure 1:
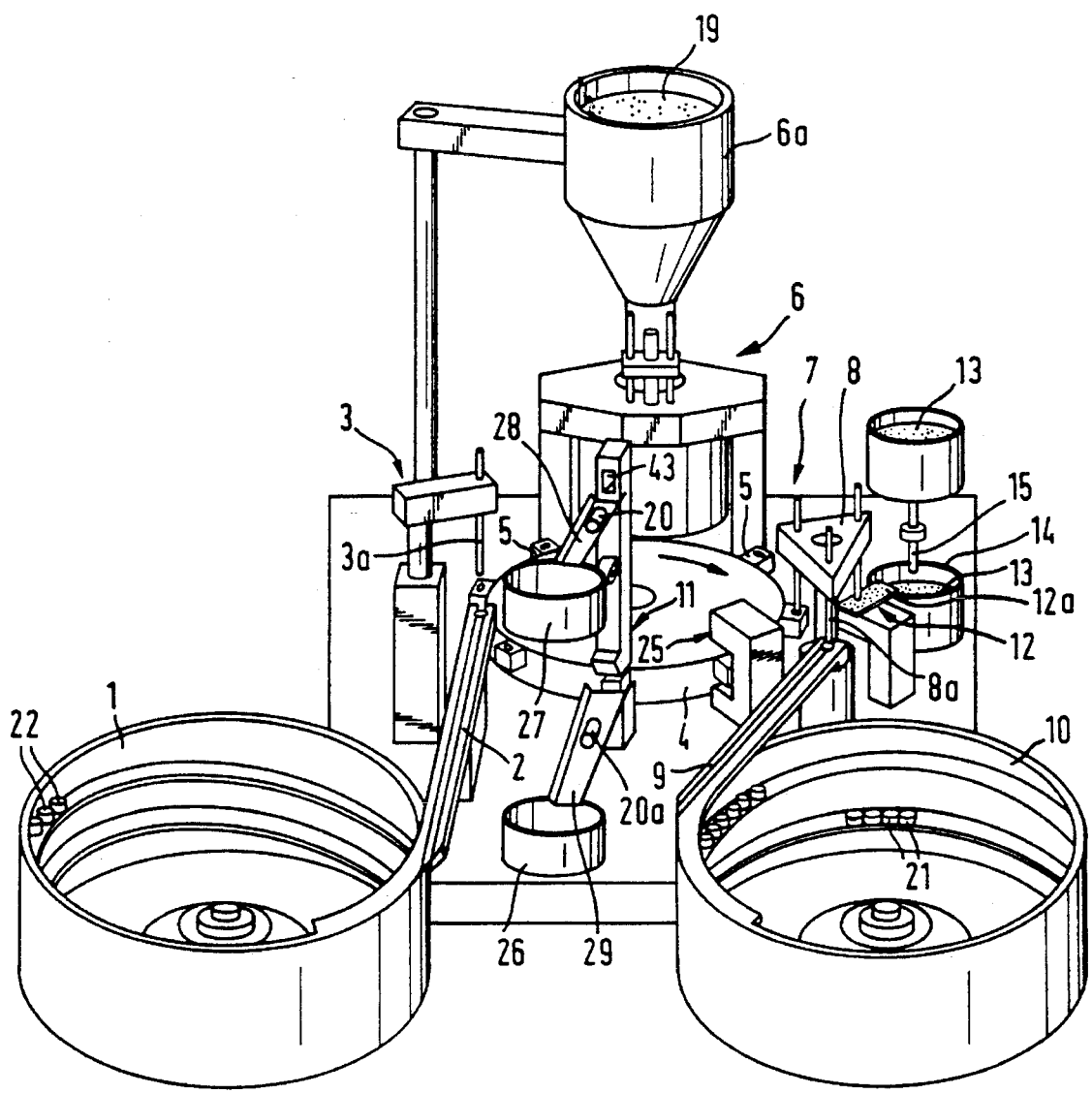
FIG. 1 shows an apparatus for producing closed sealed capsules according to the present invention.

While the invention will be described in connection with specific embodiments, it will be understood that it is not intended to limit the invention to those embodiments. To the contrary, it is intended to cover all alterations, modifications and equivalents as may be included within the spirit and the scope of the invention as defined by the appended claims.

Desirably the first and the second part of the capsule are produce by pressure moulding or pressure moulding which is accomplished by injection moulding. Preferred configurations of the first and the second parts of the capsules are disclosed in the British Patent Application No. 870 5664 (Publ. No. 2 187 703). In particular, this document discloses preferred configuration of the contact zones of the first and the second part of the capsule, and it is hereby incorporated by reference. In order to speed up the process, it is preferred when different capsules are treated at the same time, such that step (f) is performed simultaneously with steps (a) to (e), such steps (a) to (e) define a station time of the process which is independent from the predetermined time period of step (f).

Furthermore, it is preferred when the joined parts are pressed together while avoiding a direct contact between the substances packaged inside the closed capsules and the binding means.

A variety of substantially organic, film forming materials can be utilized for capsule material. Suitable materials are starch, water-soluble chemical derivatives of starch, gelatine, phthalated gelatine, gelatine succinate, cross linked gelatine, shellac, sunflower protein, soybean protein, cotton seed proteins, peanut proteins, rape seed proteins, blood proteins, egg proteins, acrylated proteins and other vegetable proteins, elginares, carrageenans, guar gum, agar-agar, gum arabic and related gums, pectin and other water-soluble polysaccharides, water-soluble derivatives of cellulose, alkylcelluloses, hydroxyalkylcelluloses and hydroxyalkylalkylcelluloses, methylcellulose, hydroxymethylcellulose, hydroxyethylcelulose, hydroxypropylcellulose, hydroxyethylmethylcellulose, hydroxypropylmethylcellulose and hydroxybutylmethylcellulose, cellulose esters and hydroxyalkylcellulose, esters including cellulose acetylphthalate (CAP), and hydroxypropylmethylcellulosephthalate (HPMCP), carboxyalkylcelluloses, carboxyalkylalkylcelluloses, and carboxyalkylcellulose esters including carboxymethylcellulose, and their alkali metal salts, water-soluble synthetic polymers including polyacrylic acids and polyacrylic acid esters, polymethacrylic acids and polymethacrylic acid esters, polyvinyl acetates, polyvinyl alcohols, polyvinyl acetate phthalates (PVAP), polyvinyl pyrrolidone, polycrotonic acids, cationically modified acrylates and methacrylates; and any combination thereof.

Preferably, the main material of the capsules is starch. Preferably, the starch is a carbohydrate of natural, vegetable origin, which is composed mainly of amylose and amlyyopectin. Preferably it is extracted from various plants, examples being potatoes, rice, tapioca, corn, and cereals such as rye, oats and wheat. By applying pressure, and at the same time raising the temperature, starch of this nature can be formed into dense moulded articles exhibiting a high degree of precision. The production technique for the pressure-moulding operation, particularly for the injection-moulding operation which is performed under pressure and at an elevated temperature, is described in European Patent Application No. 84 300 940.8 (publ. No. 118 240), and also applies for the present invention. This document specifies the process conditions (preferred temperatures, pressure, and moisture level content) and includes information regarding the possible additives, such as extenders, lubricants, plasticizers and/or coloring agents and it is hereby incorporated by reference.

The production technique of the pressure-moulding of other materials, of the above-mentioned types, and particularly for the injection-moulding operation of gelatine which is performed under pressure and at an elevated temperature, are described in European Patent Application No. 83 301 643.9 (Publ. No. 090 600), which specifies the process conditions (incl. preferred temperatures, pressures and moisture level contents) and includes information regarding possible additives, such as extenders, lubricants, plasticizers and/or coloring agents. This application is also incorporated by reference.

It is within the scope of the present invention to blend or combine the various materials listed. A blend or combination of starch and one or more coloring agents is most preferred.

To the above mentioned materials inorganic fillers may be added, such as the oxides of magnesium, aluminum, silicon, titanium, etc.. Extenders concentrations of up to 50% are indicated, but they should preferably range from 3 to 10%, based on the weight of all the components.

Examples of plasticizers which may be added include polyalkylene oxides, such as polyethylene glycols, polypropylene glycols, polyethylene-propylene glycols; organic plasticizers with lower molecular weights, such as glycerol, glycerol monoacetate, diacetate or triacetate; propylene glycol, sorbitol, sodium diethylsulfosuccinate, triethyl citrate, tributyl citrate, etc., added in concentrations ranging from 0.5 to 15%, preferably ranging from 0.5 to 5% based on the weight of all the components.

Examples of coloring agents include known azo dyes, organic or inorganic pigments, or coloring agents of natural origin. Inorganic pigments, such as the oxides of iron or titanium, are preferred. These oxides being added in concentrations ranging from 0.001 to 10%, preferably 0.5 to 3%, based on the weight of all the components.

Preferably the parts of the capsules have a water content of from 10 to 20%, more preferably from 12 to 19%, and most preferably from 14 to 18%, based on the weight of all the components. The sum of plasticizers and water content should preferably not exceed 25%, and should more preferably not exceed 20% based on the weight of all the components.

The binding means preferably used in the present invention comprises water and a polymer selected from the group consisting of gelatine, starch, modified starch, cellulose, cellulose derivatives, modified cellulose, polyvinyl alcohol, polyvinyl pyrrolidon, glycerol, other polyols, glycol, polyethylene glycols, polypropylene glycols, surface-active agents which may be anionic, cationic or amphoteric, water-soluble acrylic polymers which may be anionic or cationic, monosaccharides, oligosaccharides, and polysaccharides including dextrin and mixtures thereof.

Desirably the quantity of polymer added is up to about 50%, preferably 1 to 20% and most preferably 2 to 10% by weight, based on the total weight of the binding means.

The use of water and dextrin in an amount of 2 to 10% by weight, based on the total weight of the binding means is most preferred. An example of a suitable dextrin is the yellow dextrin TACKIDEX DF 145 from ROQUETTE that is made of potato starch.

According the present invention the binding means are applied to at least one the contact zones. Preferably the binding means are applied to the second contact zone.

Various techniques can be utilized to apply the binding means to the second contact zone. A preferred method is to spray the binding means on to the second contact zone. Preferably an excess of binding means is removed by suction means.

A further preferred method of applying the binding means is to utilize an absorbent material. The binding means are absorbed by an absorbing material and transferred to the contact zone by bringing the contact zone in direct contact with the absorbing material.

In order to provide a tight sealing between the joined parts of the capsule it is preferred to insert the joined parts of the capsule into a separate pressing device pressing the joined parts together.

In a preferred embodiment of the present invention the joined parts of the capsule are inserted into a U-like shaped container comprising two wings. The closed capsules are placed between the two wings of the container. By adjusting the distance between the two wings a predetermined pressure is applied to the closed capsules.

In a further preferred embodiment of the present invention the joined parts are inserted into a channel, are guided along the channel, and are ejected from the channel, such that the inserted parts of the capsules form a row inside the channel with successive pairs of joined parts staying in direct contact with one another. Inside the channel successive pairs of joined parts preferably have a predetermined orientation to each other.

Preferably, said channel is substantially vertical whereby the joined parts of the capsules are inserted near the bottom of the channel and are ejected near the top of the channel such that the weight of the joined parts of the capsules near the top of the channel provides sufficient pressure on the joined parts of the capsules near the bottom of the channel.

In a further preferred embodiment of the present invention said channel further comprises pressure means to provide sufficient pressure on the joined parts of the capsules. Preferably, the pressure means comprise a pneumatic piston applying a predetermined force on the joined parts of the capsule which are the next to be ejected from the channel. Preferably, the force applied by the pneumatic piston is in the range from 5.0 to 15N.

The length of the channel between the insertion and the ejection of the joined parts of the capsule is chosen in such a manner that the joined parts of the capsule stay a sufficient period of time inside the channel to obtain a strong sealed zone between the joined parts. Preferably, this period of time lies in the range from 10 to 60 sec. In order to shorten the time needed to obtain a strong sealed zone it is preferred to maintain the channel at an elevated temperature from 25° to 50° C., most preferred at about 40° C.

In order allow an easy rejection of defect parts the channel is preferably pivotable from a first position, in which the joined parts of the capsules are insertable into the channel, to a second position, in which the joined parts of the capsules are not insertable into the channel.

Furthermore it is preferred, when the channel comprises retaining means arranged near the first opening of the channel to prevent the inserted parts of the capsules from leaving the channel through the first opening. Preferably, the retaining means comprise a pawl being pivotable from a first position in which the inserted parts of the capsule are retained inside the channel to a second position in which the joined parts of the capsule are insertable into the channel, and a spring member, such that said spring member presses the pawl into the first position.

In order to guarantee a precise ejection of the joined parts of the capsule the channel preferably comprises ejection means arranged at the second opening to eject the joined parts of the capsules from the channel through the second opening. In a preferred embodiment of the present invention the ejection means comprises an ejection spring arranged at the second opening to eject the joined parts of the capsules from the channel through the second opening. In a further preferred embodiment of the present invention the ejection means comprises an ejection nozzle arranged at the second opening to eject the joined parts of the capsules from the channel through the second opening.

Figure 2:
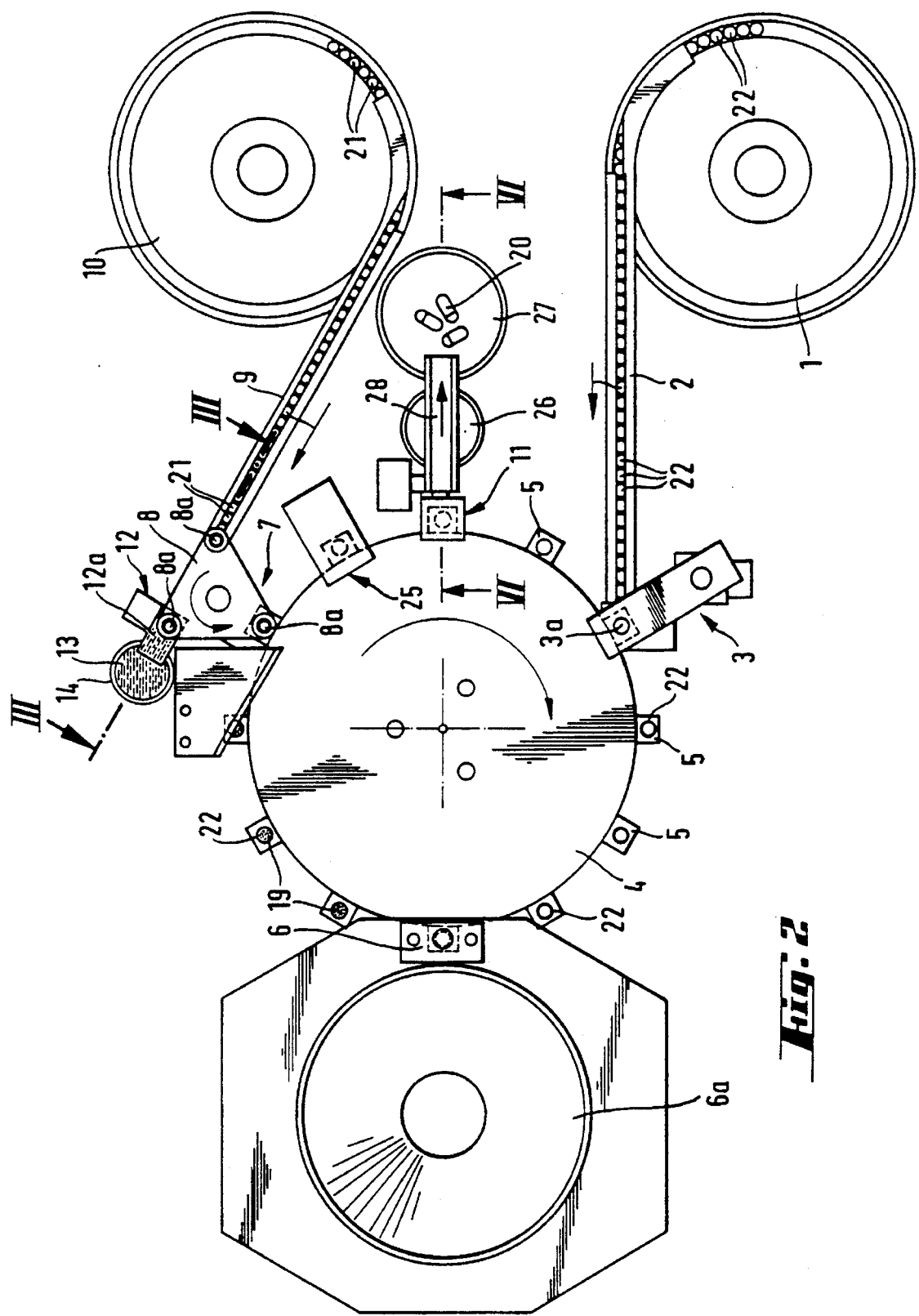
FIG. 2 is a top view on the apparatus according to FIG. 1.

FIGS. 1 and 2 show the design of an apparatus for producing closed sealed capsules according to the present invention. In this apparatus a magazine 1 stores the first parts 22 of the capsules which are subsequently used as container parts and which are filled with the product to be packaged. The magazine 1 is connected to a continuously vibrating conveying channel 2, which guides the container parts 22 of the capsules to feeding means 3. By this container part feeding means 3, the container parts 22 of the capsules are pressed into holders 5. This effected by means of a ram 3a. Thereby the openings of the container parts 22 face upwards. The holders 5 are mounted and fixed on a rotary table 4. In a sequence of timed steps, which are defined by the stepping rotation of the rotary table 4, the container parts 22 are now conveyed to filling means 6. Through the filling means 6 each container part 22 receives a metered quantity of a very fine powder 19 or a liquid 19 of medium or low viscosity. The powder 19 or the liquid 19 is supplied from a stock container 6a. Then the filled container part 22 is conveyed to the closing station 7. In this closing station 7 the second parts 21 of the capsule are placed on top of the container parts 22 and are joined with the container parts 22. The closure parts 21 are stored in a closure part magazine 10. Via second feeding means 9, a continuously vibrating conveying channel 9, the closure parts 21 are transferred to the closing station 7. The closing station 7 comprises joining means, a rotor 8 and a holder 8a, together with a container 14 containing binding means 13. The closing station 7 further comprises a wetting means 12 comprising an absorbing material 12a. The operation of the closing station 7 will be described in greater detail with reference to FIG. 3. The joined parts 21, 22 of the capsules are now further conveyed to detector means 25 that control the quality of the closed capsules. The closed capsule are then conveyed to the pressing device 11. Depending on the quality of the closed capsules, the defect capsule are guided over an outlet chute 29 to a container 26, whereas the capsule without defects are inserted into the pressing device 11. These capsules are guided through a channel inside the pressing device 11, are ejected through an opening 43 near the top of the pressing device 11 and are guided over a further outlet chute 28 into a further container 27. The operation of the pressing device 11 will be described in greater detail with reference to FIGS. 6 to 9.

The apparatus shown in FIGS. 1 and 2 is capable of treating different capsules at the same time which increases the production rate. The various steps of the production process like providing the container part of the capsules, filling the container part, closing the capsules and pressing the parts of the capsule together are performed simultaneously on different capsules. Thereby the steps of providing the container part, filling the container part and closing the capsules define a station time of the complete process that is independent of the predetermined period of time that is needed to obtain a strong sealed zone between the parts of the capsule. This means that the other process steps are not forced to wait until the time consuming pressing step is completed.

In order to further accelerate the production process the feeding means 3, the filling means 6, the closing station 7, and the holder 5 could be adapted to handle for example 3 capsules simultaneously. Then the pressing device would comprise 3 channels for pressing the capsules together.

FIG. 4 shows a filled and closed capsule in greater detail. The capsule comprises a first part 22 which is used as a container for the very fine powder 19 or the liquid 19 of medium or low viscosity. The capsule 20 is closed by a second part 21 that is placed on top of the first part 21. The first part 22 has a first contact zone 24 and the second part 21 has a second contact zone 23. By joining the parts of the capsule, the contact zones 23, 24 come into contact via the binding means 13 and form a closed and sealed zone.

Figure 3:
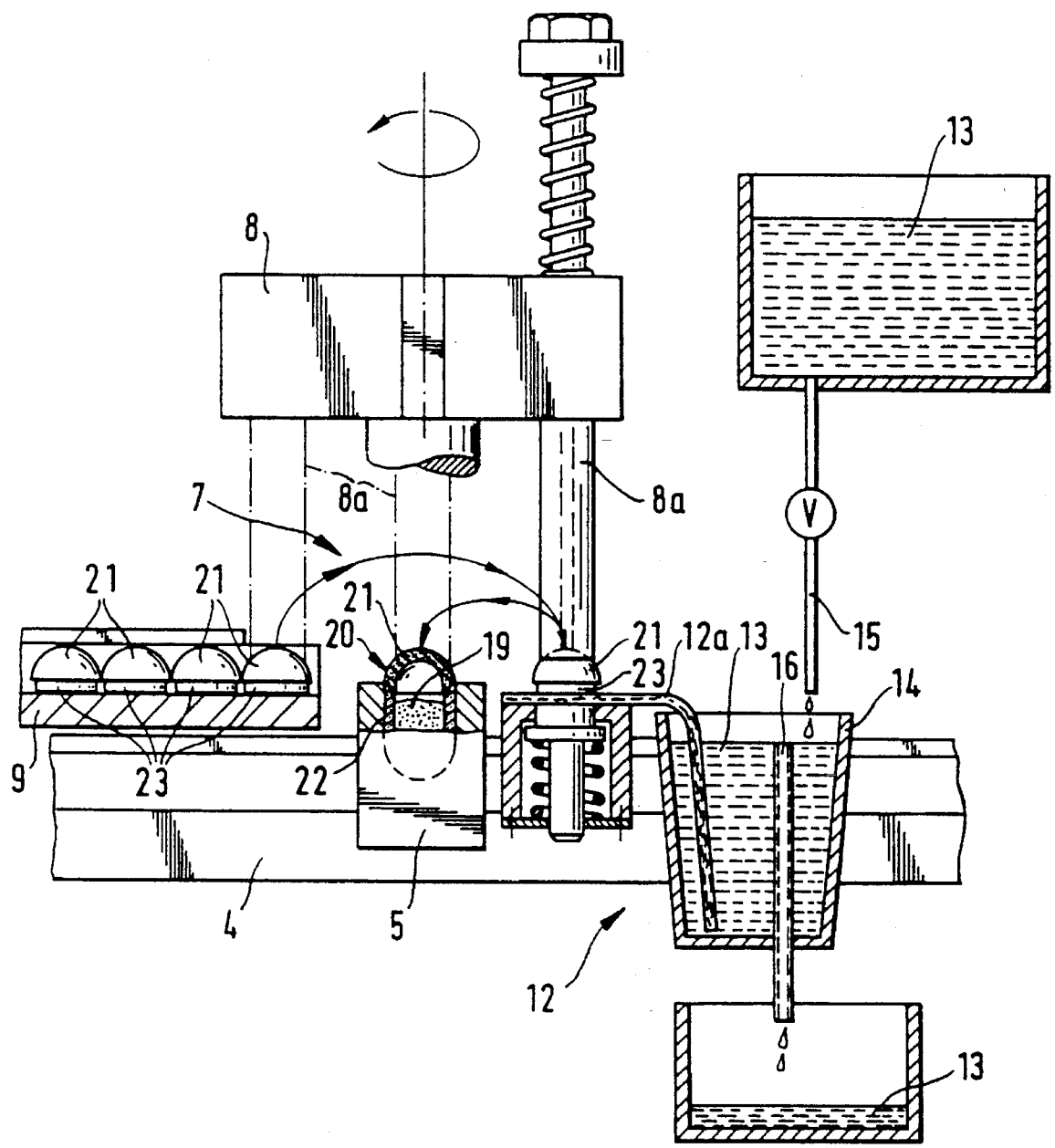
FIG. 3 shows a joining station of the apparatus according to FIG. 1.

FIG. 3 shows the closing station 7 in horizontal cross-section. The closing station 7 comprises a container 14 that stores the binding means or sealing liquid 13. In order to maintain a constant level of sealing fluid 13 within the container 14 two additional container are provided which are connected to the container 14 via a dropper 15 and an overflow 16. A piece of absorbing material, for example felt, 12a is partly dipped into the container 14. The sealing fluid 13 is drawn into the piece of felt 12a by capillarity and is transferred to the portion of the felt 12a outside the container 14.

In order to bring the second or closure parts 21 of the capsules located within the conveying channel 9 in contact with the binding means 13, the closure parts 21 are acquired by a holder 8a. The holder 8a acquires the closure parts by means of vacuum and transfers them to the portion of the felt 12a outside the container 14. A vertical movement of the holder 8a causes the closure part 21 to be pressed onto the felt 12a, whereby the contact zone 23 of the closure part 21 is wetted with the sealing liquid 13. Subsequent rotation of the holder 8a, combined with a vertical movement, brings the closure part 21 on top of the container part 22 of the capsules located in the holder 5. Then the closure part 21 and the container part 22 are joined as a result of a vertical movement of the holder 8a and a simultaneous removal of the vacuum.

Figure 6:
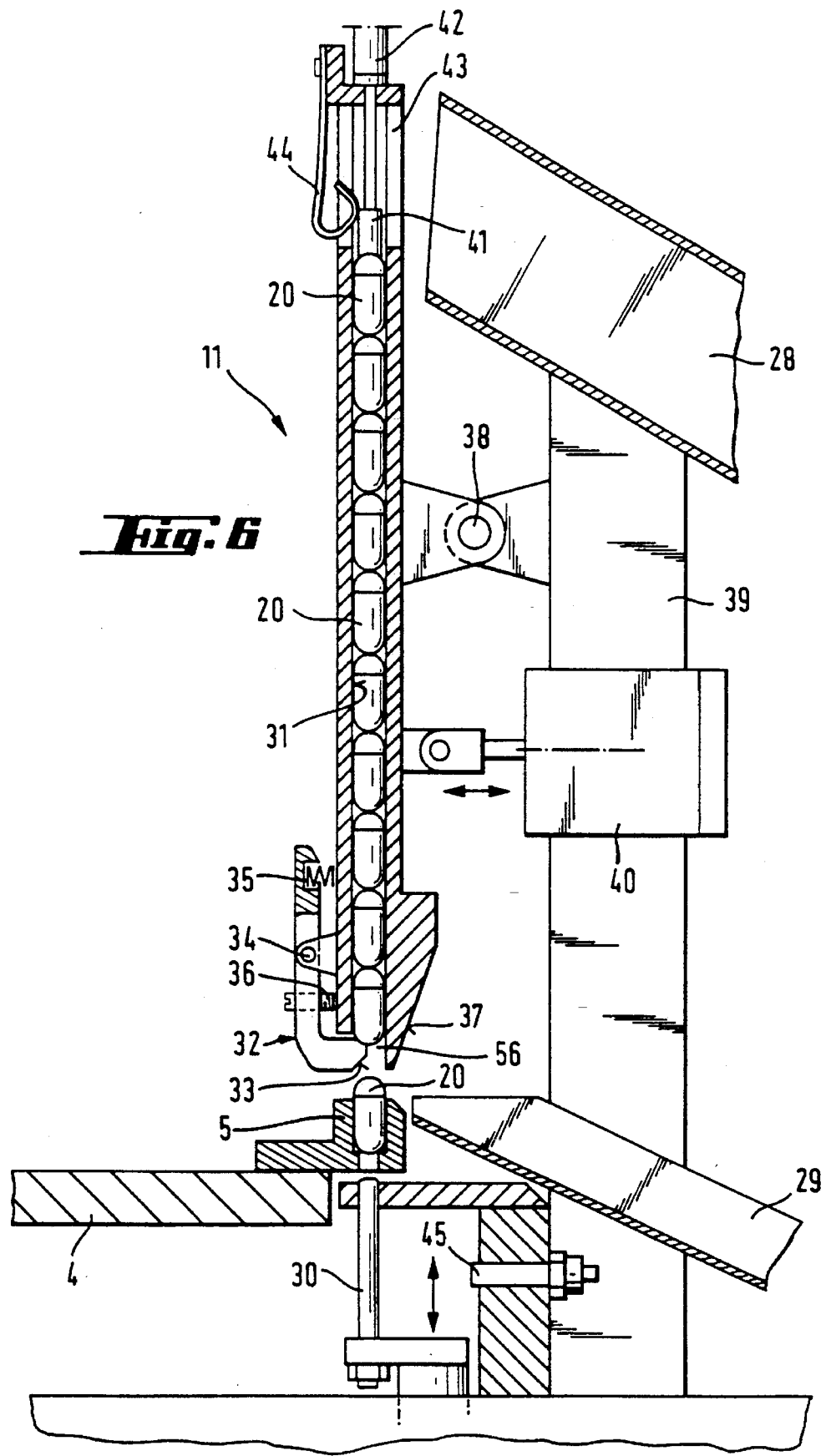
FIG. 6 shows a pressing device according to the present invention in a situation before a further capsule is inserted into the pressing device.

FIG. 6 shows schematically a pressing device 11 according to the present invention. The joined parts of the capsules 20 are located in the holder 5 which is mounted on the rotary table 4 and conveys the capsules 20 from the closing station 7 to the pressing device 11. The pressing device 11 comprises a linear channel 31, which is substantially vertical. The channel 31 has two openings, one 56 at the bottom of the channel 31 and one 43 near the top of the channel 31. A pawl 32 is arranged near bottom opening 56 to retain the joined parts of the capsules 20 inside the channel 31. The pawl 32 is pivotable about a mounting 34. However, a spring member 35 is used to keep the pawl 32 in a first position, in which the bottom opening 56 of the channel 31 is closed and a buffer 36 is pressed against the wall of the channel 31.

The capsules 20 inside the channel 31 form a vertical row, whereby successive capsules stay in direct contact with each other and have a predetermined orientation to each other. Thereby, a pressure applied to the capsule on top of the row is transmitted to all of the capsule inside the channel 31.

Near the bottom of the channel 31 a inclined plane 37 is arranged to guide the defect capsules into the outlet chute 29. This is possible because the channel 31 is pivotable about a mounting 38. Actuation means 40 arranged at the frame 39 are used to drive this rotation of the channel 31.

The channel 31 further comprises pressure means 42, 41 to provide sufficient pressure on the joined parts of the capsules. A pneumatic piston 41 applies a predetermined force on the joined parts of the capsule which are the next to be ejected from the channel 31. The pneumatic piston 41 is actuated by the actuation cylinder 42. The channel 31 further comprises ejection means 44 arranged at the second opening 43 to eject the joined parts of the capsules from the channel 31 through the second opening 43. In this embodiment the ejection means 44 comprise a ejection spring. The ejected capsule are then collected by the outlet chute 28.

Detection means (not shown) detect when the holder 5 has reached its position directly under channel 31. In order to allow the insertion of a further capsule into the channel 31, the pressure applied by the pneumatic piston is then released. A pusher 30 pushes the capsules 20 towards a inclined plane 33 near the bottom of the pawl, whereby the pawl 32 is pivoted in a second position to open the bottom opening 56 and the capsules 20 are pushed further inside the channel. Detection means 45 are used to terminate the vertical movement of the pusher once the capsule is completely inserted into the channel 31. The corresponding situation is shown in FIG. 7. By the insertion of the capsule into channel 31 the capsules 20 already inside the channel 31 are also pushed upwards so that the capsule situated at the top of the channel 31 is ejected from the channel into the outlet chute 28 to collect the closed capsules. Once the pusher 30 has left the channel 31 the pawl 32 pivot back in its original position and retains the capsules inside the channel 31. Then the pneumatic piston is again brought into contact with the capsule on top of the row and a predetermined pressure is applied.

FIG. 8 shows an other embodiment of the ejection means. In this embodiment a ejection nozzle 46 is used to the capsules from the channel 31. The ejection nozzle utilizes compressed air which is supplied through a compressed air line 47.

The channel 31 is pivotable from a first position, in which the capsules can be inserted into channel, to a second position, in which the capsules can not be inserted into channel 31. When detector means 25 (FIG. 1 and 2) detect a defective capsule 20a the channel 31 is pivoted from the first position to the second position, such that the defective capsule 20a will be pushed by the pusher 30 toward the inclined plane 37 arranged near the bottom opening 56. This inclined plane 37 is to guide defective parts 20a into the outlet chute 29 which collects the defective capsules 20a that have to be removed. The corresponding situation is shown in FIG. 9.

FIGS. 10 to 12 show another embodiment of a pressing device according to the present invention. The pressing device comprises a container 48 that has two opposite parts or wings 49, 50. The two wings 49, 50 are connected via spacing means 51 and screws 52. The container has an U-like shape, so that the closed capsule can be inserted between the two opposite wings 49, 50. The wing 49, 50 comprise sparings 54 in the shape of the capsules 20. To ease the insertion of the capsules into the container 48 the sparings 54 have conical surfaces 53. In order to adjust the pressure that is applied to the inserted capsules the distance between the two wings 49, 50 is adjusted by means of the screws 52. To ease the removal of the capsules the container 48 comprises a groove 55 arranged between the two wings 49, 50 of the container 48.

In the following specific examples of the process according to the present invention are given. Of course, these examples are merely illustrative, and not limiting.

EXAMPLE 1

Starch capsules size 0, yellow opaque, have been filled with 450 mg peanut oil (viscosity 60–70 cps) and closed on an automatic filling machine as shown in FIGS. 1 and 2 whereby a pressing device as shown in FIGS. 10 to 12 has been used. The sealing fluid contained water and 5% by weight yellow Dextrin of potato starch (TACKIDEX DF 145 from ROQUETTE). The following results have been obtained:

TABLE 1

| Trial | Method | Amount of sealing fluid | Reopened | Leakers |
|---|---|---|---|---|
| 1 | no pressing | 20 l/cap | 96% | 0% |
| 2 | no pressing | 11 l/cap | 16% | 61% |
| 3 | pressing | 11.5 l/cap | 0% | 0.2% |

As can be seen from Table 1, with a large amount of sealing fluid (Trial 1), a tight seal is achieved (no Leakers), but close to 100% of the capsules are partly reopened. When the amount of sealing fluid was optimized to 11 l/cap (Trial 2), the reopening was greatly reduced but the capsule were not tight. 61% of the capsules leaked within 24 hours.

By using the optimized amount of sealing fluid in combination with a pressing step according to the present invention (Trial 3) the reopening of the capsules was completely suppressed and also the leaking was greatly reduced.

EXAMPLE 2

Starch capsules size 0, yellow opaque, have been filled with 450 mg peanut oil (viscosity 60–70 cps) and closed on an automatic filling machine as shown in FIGS. 1 and 2 whereby a pressing device as shown in FIG. 6 has been used. The sealing fluid contained water and 5% by weight yellow Dextrin of potato starch (TACKIDEX DF 145 from ROQUETTE). The following results have been obtained:

TABLE 2

| Trial | Method | Amount of sealing fluid | Reopened | Leakers |
|---|---|---|---|---|
| 1 | no pressing | 20 l/cap | 96% | 0% |
| 2 | no pressing | 11 l/cap | 16% | 61% |
| 4 | pressing | 13.6 l/cap | 2.7% | 0% |

As can be seen from Table 2, with a large amount of sealing fluid (Trial 1), a tight seal is achieved (no Leakers), but close to 100% of the capsules are partly reopened. When the amount of sealing fluid was optimized to 11 l/cap (Trial 2), the reopening was greatly reduced but the capsule were not tight. 61% of the capsules leaked within 24 hours.

By using the pressing device according to FIG. 6 (Trial 4) the reopening of the capsules was greatly reduced and the leaking was completely suppressed.

Accordingly, by the present invention a process for joining and sealing two parts of a capsule is provided that achieves a tight sealing between two parts of the capsules so that very fine powders and liquids having medium or low viscosities can be packaged without leakage and without the negative effects of excessive fluid deposition and partial reopening of the sealed zone. Furthermore the process according to the present invention significantly reduces the amount of joined and sealed parts that have to rejected due to defects inside the sealing zone and the process is as fast as conventional closing processes.

The present invention also provides an apparatus for producing closed sealed capsules containing releasable substances packaged in at least one cavity inside the capsules which are formed of two or more joined sealed parts of substantially organic, film forming material.

What is claimed is:

1. A process for producing closed sealed capsules containing releasable substances packaged in at least one cavity inside the capsules which are formed of two or more joined sealed parts of substantially organic, film forming material, comprising the steps of:

(a) providing a first part of the capsule having a first contact zone;

(b) filling the first part of the capsule with the substances to be packaged;

(c) providing at least a second part of the capsule having a second contact zone;

(d) applying binding means to at least one of the contact zones;

(e) joining the parts of the capsule, so that the contact zones come into contact via the binding means; and (f) pressing the joined parts of the capsule together with a predetermined force so that portions of opposite contact zones are kept in pressed contact for a predetermined period of time to obtain the closed sealed capsule;

wherein the joined parts of the capsules are inserted into a pressing device pressing the joined parts together and wherein the pressing device comprises a U-shaped container comprising two wings and means for adjusting the distance between the wings, such that the joined parts of the capsule are placed between the two wings and a predetermined pressure is applied to the joined parts by adjusting the distance between the two wings.

2. The process according to claim 1, wherein different capsules are treated at the same time such that step (f) is performed simultaneously with said steps (a) to (e), such steps (a) to (e) defining a station time of the process which is independent from the predetermined time period of step (f).

3. The process according to claim 1, wherein the joined parts are pressed together while avoiding a direct contact between the substances packaged inside the closed capsules and the binding means.

4. The process according to claim 1, wherein the substantially organic, film forming material is selected from the group consisting of: starch, water-soluble chemical derivatives of starch, gelatine, phthalated gelatine, gelatine succinate, cross linked gelatine, shellac, sunflower protein, soybean protein, cotton seed proteins, peanut proteins, rape seed proteins, blood proteins, egg proteins, acrylated proteins and other vegetable proteins, alginates, carrageenans, guar gum, agar-agar, gum arabic and related gums, pectin and other water-soluble polysaccharides, water-soluble derivatives of cellulose, alkylcelluloses, hydroxyalkylcelluloses and hydroxyalkylalkylcelluloses, methylcellulose, hydroxymethylcellulose, hydroxyethylcellulose, hydroxypropylcellulose, hydroxyethylmethylcellulose, hydroxypropylmethylcellulose and hydroxybutylmethylcellulose, cellulose esters and hydroxyalkylcellulose esters including cellulose acetylphthalate (CAP), and hydroxypropylmethylcellulosephthalate (HPMCP), carboxyalkylcelluloses, carboxyalkylalkylcelluloses, and carboxyalkylcellulose esters including carboxymethylcellulose, and their alkali metal salts, water-soluble synthetic polymers including polyacrylic acids and polyacrylic acid esters, polymethacrylic acids and polymethacrylic acid esters, polyvinyl acetates, polyvinyl alcohols, polyvinyl acetate phthalates (PVAP), polyvinyl pyrrolidone, and polycrotonic acids, and cationically modified acrylates and methacrylates; and any combination thereof.

5. The process according to claim 4, wherein the substantially organic, film forming material further comprises extenders, plasticizers, coloring agents or combinations thereof.

6. The process according to claim 1, wherein the substantially organic, film forming material comprises starch and coloring agents.

7. The process according to claim 1, wherein the binding means comprise water and a polymer selected from the group consisting of gelatine, starch, modified starch, cellulose, cellulose derivatives, modified cellulose, polyvinyl alcohol, polyvinyl pyrrolidon, glycerol, other polyols, glycol, polyethylene glycols, polypropylene glycols, surface-active agents which may be anionic, cationic or amphoteric, water-soluble acrylic polymers which may be anionic or cationic, monosaccharides, oligosaccharides, and polysaccharides including dextrin and mixtures thereof.

8. The process according to claim 7, wherein the quantity of polymer added is up to about 50% by weight, based on the total weight of the binding means.

9. The process according to claim 1, wherein the binding means comprise water and dextrin in an amount of 2 to 10% by weight, based on the total weight of the binding means.

10. The process according to claim 1, wherein the binding means are applied to the second contact zone.

11. The ,process according to claim 10, wherein the binding means are sprayed to the second contact zone.

12. The process according to claim 11, wherein an excess of binding means is removed by suction means.

13. The process according to claim 10, wherein the binding means are absorbed by an absorbing material and transferred to the contact zone by bringing the contact zone in direct contact with the absorbing material.

14. The process according to claim 1, wherein the joined parts of the capsules are inserted into a channel, are guided along the channel, and are ejected from the channel, such that the inserted parts of the capsules form a row inside the channel with successive pairs of joined parts staying in direct contact with one another.

15. The process according to claim 14, wherein said channel is substantially vertical and the joined parts of the capsules are inserted near the bottom of the channel and are ejected near the top of the channel such that the weight of the joined parts of the capsules near the top of the channel provides sufficient pressure on the joined parts of the capsules near the bottom of the channel.

16. The process according to claim 14, wherein said channel further comprises pressure means to provide sufficient pressure on the joined parts of the capsules.

17. The process according to claim 16, wherein the pressure means comprise a pneumatic piston applying a predetermined force on the joined parts of the capsule which is the next to be ejected from the channel.

18. The process according to claim 16, wherein the channel is maintained at an elevated temperature from 25° to 50° C.

19. The process according to claim 1, wherein the two parts are pressed together for about 10 to 60 seconds.

20. An apparatus for producing closed sealed capsules (20) containing releasable substances (19) packaged in at least one cavity inside the capsules which are formed of two joined sealed parts (21, 22) of substantially organic, film forming material, comprising:

first feeding means (3, 3a) for providing a first part (22) of the capsule (20) having a first contact zone (24);

filling means (6) for filling the first part of the capsule with the substances (19) to be packaged;

second feeding means (9) for providing a second part (21) of the capsule (20) having a second contact surface (23);

wetting means (12, 12a) for applying binding means (13) to at least one of the contact zones (23, 24);

joining means (8, 8a) for joining the two parts (21, 22) of the capsule (20) so that the contact zone (23, 24) come into contact via the binding means (13); and at least one pressing device (11, 48) for pressing the joined parts (21, 22) of the capsule together with a predetermined force so that portions of the opposite contact zones (23, 24) are kept in pressed contact for a predetermined period of time to obtain the closed sealed capsule (20); and wherein the pressing device (11, 48) comprises at least one U-like shaped container (48) comprising two wings (49, 50) and means (51, 52) for adjusting the distance between the wings (49, 50), such that the joined parts (21, 22) of the capsule (20) are placed between the two wings (49, 50) and a predetermined pressure is applied to the joined parts (21, 22) by adjusting the distance between the two wings (49, 50).

21. The apparatus according to claim 20, wherein the pressing device (11) comprises at least one channel (31) having a first opening (56) and a second opening (43) spaced apart from the first opening (56), such that the joined parts (21, 22) of the capsules (20) are insertable into the channel (31) through the first opening (56), are guidable along the channel (31) and are ejectable from the channel (31) through the second opening (43), whereby the inserted parts (21, 22) of the capsules (20) form a row such that successive pairs of joined parts (21, 22) stay in direct contact with one another.

22. The apparatus according to claim 21, wherein the channel (31) comprises pivoting means such that the channel is pivotable from a first position, in which the joined parts (21, 22) of the capsules (20) are insertable into the channel (31), to a second position, in which the joined parts (21, 22) of the capsules (20) are not insertable into the channel (31).

23. The apparatus according to claim 21, wherein said channel (31) is substantially vertical with the first opening (56) arranged near the bottom of the channel (31) and the second opening (43) arranged near the top of the channel (31) such that the weight of the joined parts (21, 22) of the capsules (20) near the top of the channel (31) provides sufficient pressure on the joined parts (21, 22) of the capsules (20) near the bottom of the channel (31).

24. The apparatus according to claim 21, wherein said channel (31) further comprises pressure means (41, 42) to provide sufficient pressure on the joined parts (21, 22) of the capsules (20).

25. The apparatus according to claim 24, wherein the pressure means (41, 42) comprise a pneumatic piston (41) applying a predetermined force on the joined parts (21, 22) of the capsule (20) which are the next to be ejected from the channel (31).

26. The apparatus according to claim 5, wherein the force applied by the pneumatic piston (41) is in the range from 5.0 to 15N.

27. The apparatus according to claim 24, wherein the channel (31) comprises retaining means (32) arranged near the first opening (56) of the channel (31) to prevent the inserted parts (21, 22) of the capsules (20) from leaving the channel (31) through the first opening (56).

28. The apparatus according to claim 27, wherein the retaining means (32) comprise a pawl being pivotable from a first position in which the inserted parts (21, 22) of the capsule (20) are retained inside the channel (31) to a second position in which the joined parts (21, 22) of the capsule (20) are insertable into the channel (31), and a spring member (35), such that said spring (35) member presses the pawl (32) towards the first position.

29. The apparatus according to claim 24, wherein said channel (31) further comprises ejection means (44, 46) arranged at the second opening (43) to eject the joined parts (21, 22) of the capsules (20) from the channel (31) through the second opening (43).

30. The apparatus according to claim 29, wherein the ejection means (44, 46) comprises an ejection spring (44) arranged at the second opening (43) to eject the joined parts (21, 22) of the capsules (20) from the channel (31) through the second opening (43).

31. The apparatus according to claim 29, wherein the ejection means (44, 46) comprises an ejection nozzle (46) arranged at the second opening (43) to eject the joined parts (21, 22) of the capsules (20) from the channel (31) through the second opening (43).

32. The pressing device according to claim 24, wherein the pressing device (11, 48) further comprises temperature adjusting means to adjust the temperature of the channel at an elevated temperature from 25° to 50°.

* * * * *